(12) United States Patent
Seok

(10) Patent No.: US 9,781,670 B2
(45) Date of Patent: Oct. 3, 2017

(54) METHOD AND DEVICE FOR IMPLEMENTING POWER SAVING IN WIRELESS LAN SYSTEM

(71) Applicant: LG ELECTRONICS INC., Seoul (KR)

(72) Inventor: Yongho Seok, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/912,833

(22) PCT Filed: Jul. 29, 2014

(86) PCT No.: PCT/KR2014/006930
§ 371 (c)(1),
(2) Date: Feb. 18, 2016

(87) PCT Pub. No.: WO2015/026074
PCT Pub. Date: Feb. 26, 2015

(65) Prior Publication Data
US 2016/0212703 A1 Jul. 21, 2016

Related U.S. Application Data

(60) Provisional application No. 61/867,555, filed on Aug. 19, 2013.

(51) Int. Cl.
*G08C 17/00* (2006.01)
*H04W 52/02* (2009.01)
(Continued)

(52) U.S. Cl.
CPC ....... *H04W 52/0216* (2013.01); *H04L 1/1628* (2013.01); *H04L 1/1685* (2013.01);
(Continued)

(58) Field of Classification Search
CPC ......... H04W 52/0216; H04W 52/0225; H04W 52/0238; H04W 28/0221; H04W 84/12; H04L 1/1628; H04L 1/1685; Y02B 60/50
(Continued)

(56) References Cited

U.S. PATENT DOCUMENTS

2007/0191052 A1* 8/2007 Kneckt ................ H04W 52/04
455/522
2011/0294491 A1* 12/2011 Fong ...................... H04L 5/001
455/422.1
(Continued)

FOREIGN PATENT DOCUMENTS

WO WO 2013/077653 A1 5/2013

OTHER PUBLICATIONS

Anastasi et al., "IEEE 802.11 Ad Hoc Networks: Protocols, Performance and Open Issues," URL:http://info.iet.unipi.it/~anastasi/papers/book_ch03.pdf, 2004, pp. 1-63.
(Continued)

*Primary Examiner* — Peter Cheng
(74) *Attorney, Agent, or Firm* — Birch, Stewart, Kolasch & Birch, LLP

(57) ABSTRACT

The present invention relates to a wireless communication system, and, more particularly, a method and device for implementing power saving in a wireless LAN system are disclosed. A method of implementing power saving by a station (STA) in a wireless LAN system according to an embodiment of the present invention may include the steps of: receiving a plurality of frames from an access point (AP) by means of the station STA that is changed from a sleep state to an awake state; determining whether each of the plurality of frames has an error; and transmitting a response frame representing the presence and absence of the error to the AP. Even if each of the plurality of frames includes
(Continued)

information instructing the AP to stop transmitting to the station to the station STA, it is possible to maintain the awake state when at least one of the plurality of frames has an error.

10 Claims, 14 Drawing Sheets

(51) Int. Cl.
*H04W 28/02* (2009.01)
*H04L 1/16* (2006.01)
*H04W 84/12* (2009.01)

(52) U.S. Cl.
CPC ... *H04W 28/0221* (2013.01); *H04W 52/0225* (2013.01); *H04W 52/0238* (2013.01); *H04W 84/12* (2013.01); *Y02B 60/50* (2013.01)

(58) Field of Classification Search
USPC .......................................................... 370/311
See application file for complete search history.

(56) References Cited

U.S. PATENT DOCUMENTS

| | | | |
|---|---|---|---|
| 2014/0029597 A1* | 1/2014 | Chu | H04W 52/0206 370/338 |
| 2014/0177614 A1* | 6/2014 | Asterjadhi | H04W 28/04 370/338 |
| 2014/0204821 A1 | 7/2014 | Seok et al. | |

OTHER PUBLICATIONS

Belghith, "Enhancing PSM Efficiencies in Infrastructure 802.11 Networks," International Journal of Computing & Information Sciences, vol. 5, No. 1, Apr. 2007, On-Line, pp. 13-23.

Idland, "Detecting MAC Spoofing Attacks in 802.11 Networks through Fingerprinting on the MAC Layer," Norwegian University of Science and Technology, Jun. 2011, pp. 1-96 (Total pp. 105).

* cited by examiner

FIG. 11
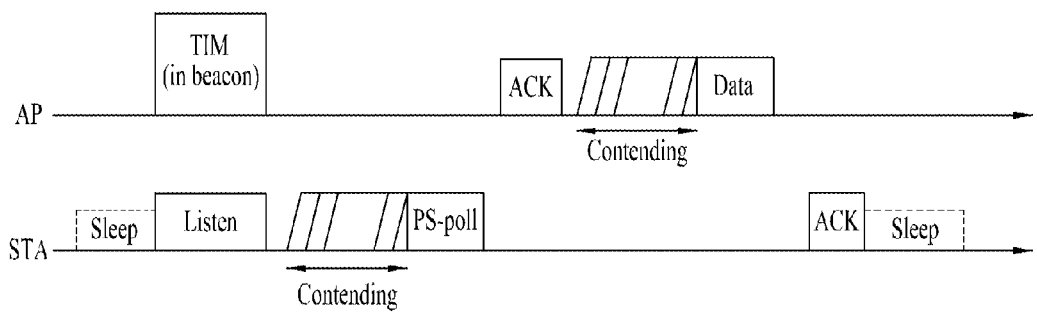
FIG. 12
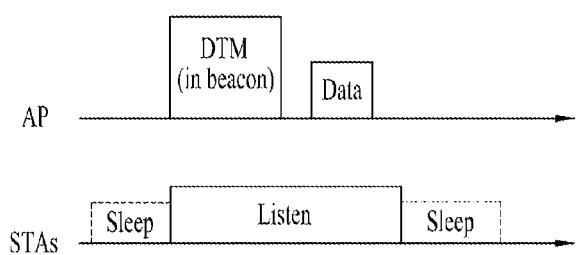
FIG. 13
| Category | Wakeup Action | Dialog Token | Optional Subelements |
|---|---|---|---|
| Octets: 1 | 1 | 1 | Variables |

| Category | Wakeup Action | Dialog Token | Awake Duration | Optional Subelements |
|---|---|---|---|---|
| Octets: 1 | 1 | 1 | n | Variables |

FIG. 17

| Element ID | Length | Application Layer Turnaround Time |
|---|---|---|
Octets: 1 | 1 | 1

METHOD AND DEVICE FOR IMPLEMENTING POWER SAVING IN WIRELESS LAN SYSTEM

CROSS REFERENCE TO RELATED APPLICATIONS

This application is the National Phase of PCT International Application No. PCT/KR2014/006930, filed on Jul. 29, 2014, which claims priority under 35 U.S.C. 119(e) to U.S. Provisional Application No. 61/867,555, filed on Aug. 19, 2013, all of which are hereby expressly incorporated by reference into the present application.

TECHNICAL FIELD

The present invention relates to a wireless communication system, and more particularly, to a method and apparatus for a power saving operation in a wireless LAN system.

BACKGROUND ART

With recent development of information communication technologies, a variety of wireless communication technologies have been developed. From among such technologies, WLAN is a technology that allows wireless Internet access at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input Multiple Output (MIMO) technology, which employs multiple antennas for both a transmitter and a receiver in order to minimize transmission errors and optimize data rate, has been introduced.

DISCLOSURE OF THE INVENTION

Technical Task

As a next generation communication technology, M2M (machine-to-machine) communication technology is currently discussed. A standard for technology supportive of M2M communication is currently developed in IEEE 802.11 WLAN system. M2M communication may consider a scenario of performing communications of a small amount of data at low speed occasionally in an environment having numerous devices exist therein.

The technical task of the present invention is to provide an operating scheme for minimizing power consumption of a user equipment operating in sleep/awake state.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of performing a power saving, which is performed by a station (STA) in a wireless LAN system, according to one embodiment of the present invention may include receiving a plurality of frames from an access point (AP) by the STA switched to an awake state from a sleep state, determining whether error is occurred in each of the plurality of frames, and transmitting a response frame indicating whether the error is occurred to the AP, wherein although information instructing the AP to stop the transmission to the STA is included in each of the plurality of frames, if the error is occurred in at least one of the plurality of frames, maintaining the awake state.

To further achieve these and other advantages and in accordance with the purpose of the present invention, as embodied and broadly described, a method of supporting a power saving of a station (STA) by an access point (AP) in a wireless LAN system according to another embodiment of the present invention may include transmitting a plurality of frames from the AP to the STA switched to an awake state from a sleep state and receiving a response frame indicating whether an error is occurred in each of the plurality of frames from the STA, wherein although information instructing the AP to stop the transmission to the STA is included in each of the plurality of frames, if the error is occurred in at least one of the plurality of frames, the at least one frame in which the error is occurred is retransmitted to the STA right after the reception of the response frame.

To further achieve these and other advantages and in accordance with the purpose of the present invention, as embodied and broadly described, in performing a power saving in a wireless LAN system, a station (STA) according to further embodiment of the present invention may include a transceiver and a processor controlling the STA switched to an awake state from a sleep state to receive a plurality of frames from an access point (AP), the processor determining whether an error is occurred in each of the plurality of frames, the processor controlling the transceiver to transmit a response frame indicating whether the error is occurred to the AP, wherein although information instructing the AP to stop the transmission to the STA is included in each of the plurality of frames, if the error is occurred in at least one of the plurality of frames, maintaining the awake state.

To further achieve these and other advantages and in accordance with the purpose of the present invention, as embodied and broadly described, an access point (AP) supportive of a power saving of a station (STA) in a wireless LAN system according to another further embodiment of the present invention may include a transceiver and a processor controlling the transceiver to transmit a plurality of frames to the STA switched to an awake state from a sleep state, the processor controlling the transceiver to receive a response frame indicating whether an error is in each of the plurality of frames from the STA, wherein although information instructing the AP to stop the transmission to the STA is included in each of the plurality of frames, if the error is occurred in at least one of the plurality of frames, the at least one frame in which error is occurred is retransmitted to the STA right after the reception of the response frame.

The following matters may be included in the above embodiments of the present invention.

The at least one frame in which the error is occurred may be retransmitted to the STA from the AP right after the response frame.

If the information instructing the AP to stop the transmission to the STA is included in the each of the plurality of frames and the plurality of frames are received all successfully without error, the STA may enter the sleep state.

After the STA has been switched to the awake state from the sleep state, before the STA receives the plurality of frames from the AP, a polling frame may be transmitted to the AP from the STA and a frame responding to the polling frame may be transmitted to the STA from the AP.

The polling frame may be transmitted to the AP in a state that the STA does not receive traffic indication map (TIM) from the AP.

The polling frame may include a power save-poll (PS-Poll) frame or a wakeup poll frame and the frame responding to the polling frame may include an ACK frame or a wakeup confirm frame.

The information instructing to stop the transmission may include end of service period (EOSP) bit set to 1 and the EOSP bit may be included in each of the plurality of frames.

The information instructing to stop the transmission may include More Data bit set to 0 and the More Data bit may be included in each of the plurality of frames.

The plurality of frames may be included in Aggregated-MAC Protocol Data Unit (A-MPDU).

The response frame may include a block ACK frame.

The aforementioned general description of the present invention and the following detailed description of the present invention are exemplary and are provided for description in addition to the appended claims in this disclosure.

Advantageous Effects

According to the present invention, a method and apparatus for minimizing power consumption in a user equipment operating in sleep/awake state can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the present invention, illustrate various embodiments of the present invention and together with the descriptions in this specification serve to explain the principle of the invention.

FIGS. 10 to 12 illustrate operations of a station (STA) having received a TIM in detail.

FIG. 13 is a diagram for one example of a format of a wakeup polling frame.

FIG. 17 is a diagram for one example of a format of ALTT information element.

BEST MODE FOR INVENTION

Figure 1:
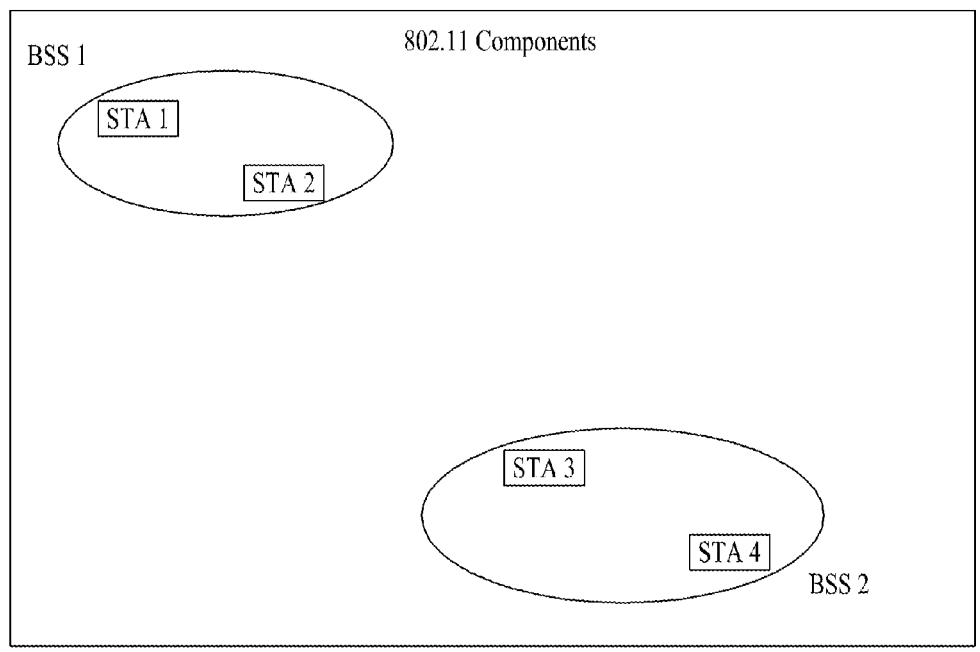
FIG. 1 is a diagram showing an exemplary structure of an IEEE 802.11 system to which the present invention is applicable.

Reference will now be made in detail to exemplary embodiments of the present invention, examples of which are illustrated in the accompanying drawings. The detailed description, which will be given below with reference to the accompanying drawings, is intended to explain exemplary embodiments of the present invention, rather than to present all embodiments that can be implemented according to the invention. The following detailed description includes specific details in order to provide a thorough understanding of the present invention. However, it will be apparent to those skilled in the art that the present invention may be practiced without such specific details.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Specific terms are employed in the following description for better understanding of the present invention. Such specific terms may take other forms within the technical scope or spirit of the present invention.

In some cases, well-known structures and devices are omitted in order to avoid obscuring the concepts of the present invention and important functions of the structures and devices may be mainly illustrated in the form of block diagrams.

Exemplary embodiments of the present invention are supported by standard documents disclosed for at least one of an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system, which are wireless access systems. That is, steps or parts which are not described to clearly reveal the technical spirit of the present invention in the embodiments of the present invention may be supported by the above documents. All terminology used herein may be supported by at least one of the aforementioned documents.

The following embodiments of the present invention can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access). CDMA may be embodied through a radio technology such as UTRA (Universal Terrestrial Radio Access) or CDMA2000. TDMA may be embodied through radio technologies such as GSM (Global System for Mobile communication)/GPRS (General Packet Radio Service)/EDGE (Enhanced Data Rates for GSM Evolution). OFDMA may be embodied through radio technologies such as IEEE 802.11 (Wi-Fi), IEEE 802.16 (WiMAX), IEEE 802.20, and E-UTRA (Evolved UTRA). For clarity, the following description mainly focuses on IEEE 802.11 systems, but technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by interaction between components. A Basic Service Set (BSS) may correspond to a basic component block in an IEEE 802.11 LAN. In FIG. 1, two BSSs (BSS1 and BSS2) are shown and each of the BSSs includes two STAs as members thereof (i.e., STA1 and STA2 are included in BSS1, and STA3 and STA4 are included in BSS2). In FIG. 1, an ellipse indicating each BSS may be understood as a coverage area in which STAs included in the BSS maintain communication. This area may be referred to as a basic service area (BSA). If an STA moves out of the BSA, the STA cannot directly communicate with the other STAs within the BSA.

In the IEEE 802.11 LAN, the most basic type of BSS is an independent BSS (IBSS). For example, the IBSS may have a minimal form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. This type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically established and may involve use of a distribution system service (DSS).

Figure 2:
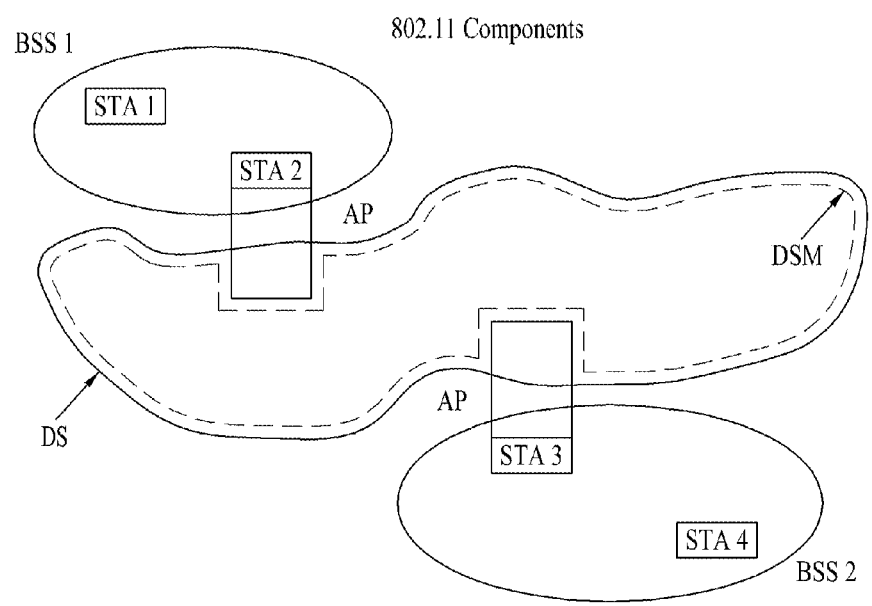
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be limited by physical layer (PHY) performance. In some cases, such limited distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network including a plurality of BSSs, rather than being independently present as shown in FIG. 1.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) can be explained by the fact that plural media are logically different from each other. That is, the IEEE 802.11 LAN architecture can be implemented in various manners and may be independently specified by a physical property of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs basically correspond to STAs, all APs are addressable entities. An address used by an AP for communication on the WM need not be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frames) may be transmitted to the DS.

Figure 3:
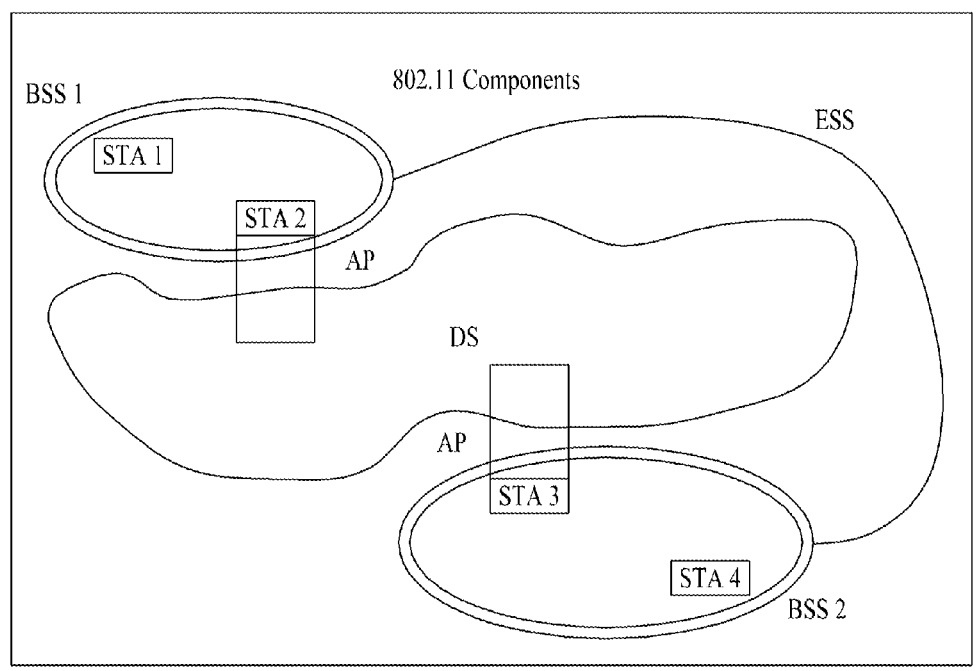
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be constructed by a DS and BSSs. In the IEEE 802.11 system, this type of network is referred to as an ESS network. The ESS may correspond to a set of BSSs connected to one DS. However, the ESS does not include the DS. The ESS network is characterized in that the ESS network is viewed as an IBSS network in a logical link control (LLC) layer. STAs included in the ESS may communicate with each other and mobile STAs are movable transparently from one BSS to another BSS (within the same ESS) in LLC.

Regarding relative physical locations of the BSSs in FIG. 3, IEEE 802.11 does not assume any arrangement, and all the following arrangements are possible. BSSs may partially overlap and this positional arrangement is generally used to provide continuous coverage. In addition, the BSSs may not be physically connected, and a distance between BSSs is not logically limited. The BSSs may be located at the same physical position and this positional arrangement may be adopted to provide redundancy. One (or at least one) IBSS or ESS network may be physically present in one space as one (or at least one) ESS network. This may correspond to an ESS network form taken in the case in which an ad-hoc network operates in a location where the ESS network is present, in the case in which IEEE 802.11 networks of different organizations physically overlap, or in the case in which two or more different access and security policies are needed in the same location.

Figure 4:
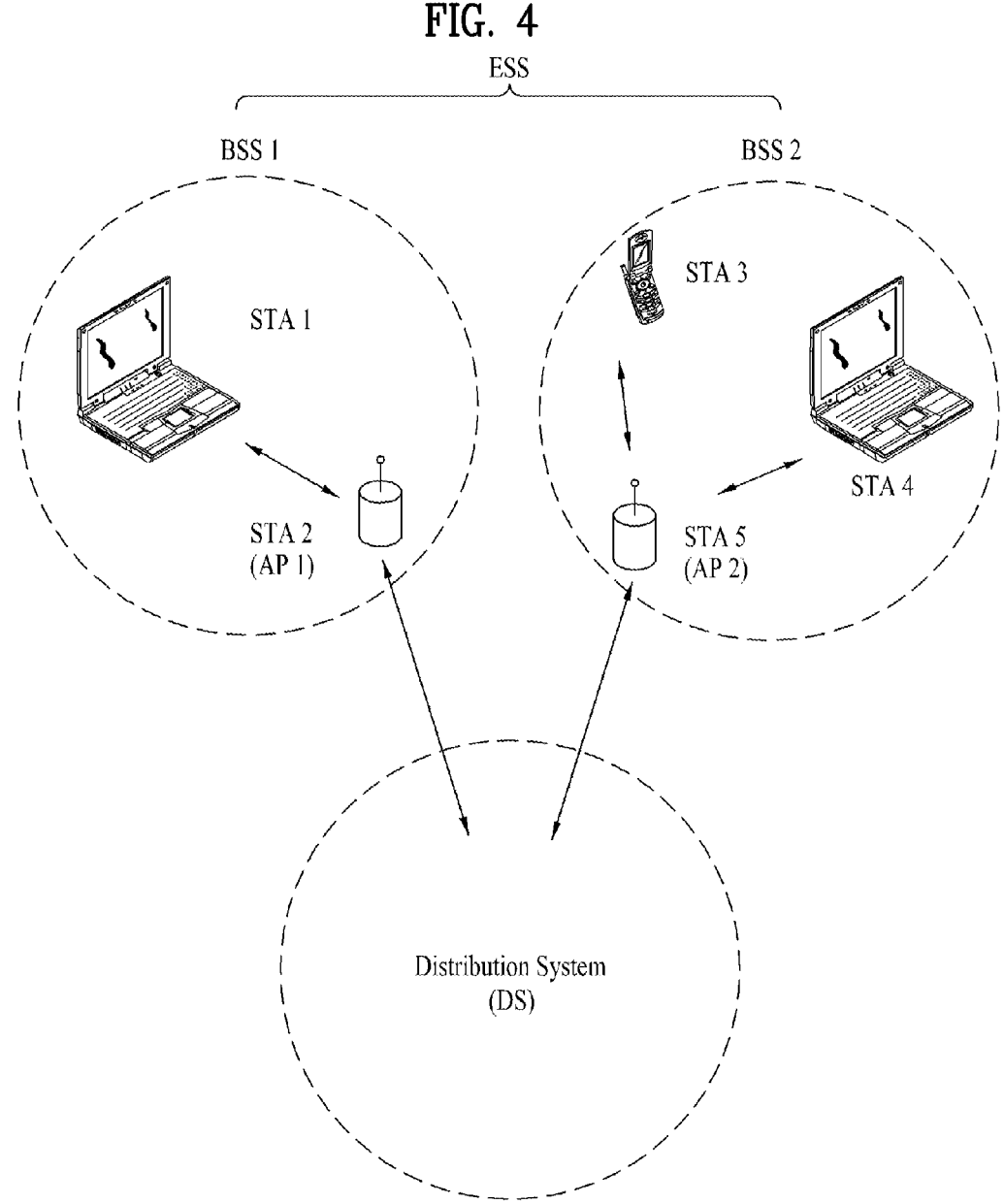
FIG. 4 is a diagram showing an exemplary structure of a WLAN system.

FIG. 4 is a diagram showing an exemplary structure of a WLAN system. FIG. 4 shows an exemplary infrastructure BSS including a DS.

In the example of FIG. 4, BSS1 and BSS2 constitute an ESS. In the WLAN system, an STA is a device operating according to MAC (Medium Access Control)/PHY (Physical) regulation of IEEE 802.11. STAs include AP STAs and non-AP STAs. The non-AP STAs correspond to devices such as laptop computers or mobile phones which are generally handled directly by users. In the example of FIG. 4, STA 1, STA 3, and STA 4 correspond to the non-AP STAs and STA 2 and STA 5 correspond to AP STAs.

In the following description, the non-AP STA may be called a terminal, a wireless transmit/receive unit (WTRU), user equipment (UE), a mobile station (MS), a mobile terminal, or a mobile subscriber station (MSS). The AP is a concept corresponding to a base station (BS), a Node-B, an evolved Node-B (e-NB), a base transceiver system (BTS), or a femto BS in other wireless communication fields.

Layer Structure

Operation of an STA in a wireless LAN system can be described in terms of a layer structure. A layer structure in a device configuration can be implemented by a processor. STA may have a multiple layer structure. For example, 802.11 standard document mainly describes a MAC sublayer and a physical (PHY) layer on a data link layer (DLL). The PHY layer may include a PLCP (Physical Layer Convergence Procedure) entity, a PMD (Physical Medium Dependent) entity and the like. The MAC sublayer and PHY layer respectively include management entities, which are respectively called an MLME (MAC sublayer Management Entity) and a PLME (Physical Layer Management Entity). These entities provide a layer management service interface through which a layer management function is operated.

To provide accurate MAC operation, an SME (Station Management Entity) is present in each STA. The SME is a layer-independent entity which is present in a separate management plane or can be regarded as off to the side. While functions of the SME are not described in detail in the specification, the SME can be considered to execute functions of collecting layer-dependent statues from various layer management entities (LMEs), setting layer-specific parameters to similar values and the like. The SME can execute such functions on behalf of normal system management entities and implement a standard management protocol, in general.

The aforementioned entities interact in various manners. For example, entities can interact by exchanging GET/SET primitives therebetween. A primitive refers to a set of elements of parameters related to a specific purpose. XX-GET.request primitive is used to request the value of a given MIB attribute (management information based attribute information). XX-GET.confirm primitive is used to return an appropriate MIB attribute information value in the case of a status of "success" and to return an error indication in a status field otherwise. XX-SET.request primitive is used to request an indicated MIB attributed to be set to a given value. When the MIB attribute refers to a specific operation, this represents request for execution of the operation. XX-SET.confirm primitive is used to confirm that an indicated MIB attribute has been set to a requested value in the case of a status of "success" and to return an error condition in the status field otherwise. When the MIB attribute refers to a specific operation, this confirms that the corresponding operation has been performed.

In addition, the MLME and the SME can exchange various MLME_ GET/SET primitives through an MLME-_SAP (Service Access Point) therebetween. Furthermore, various PLME_GET/SET primitives can be exchanged between the PLME and the SME through a PLME_SAP and between the MLME and the PLME through an MLME-PLME_SAP.

Link Setup Process

Figure 5:
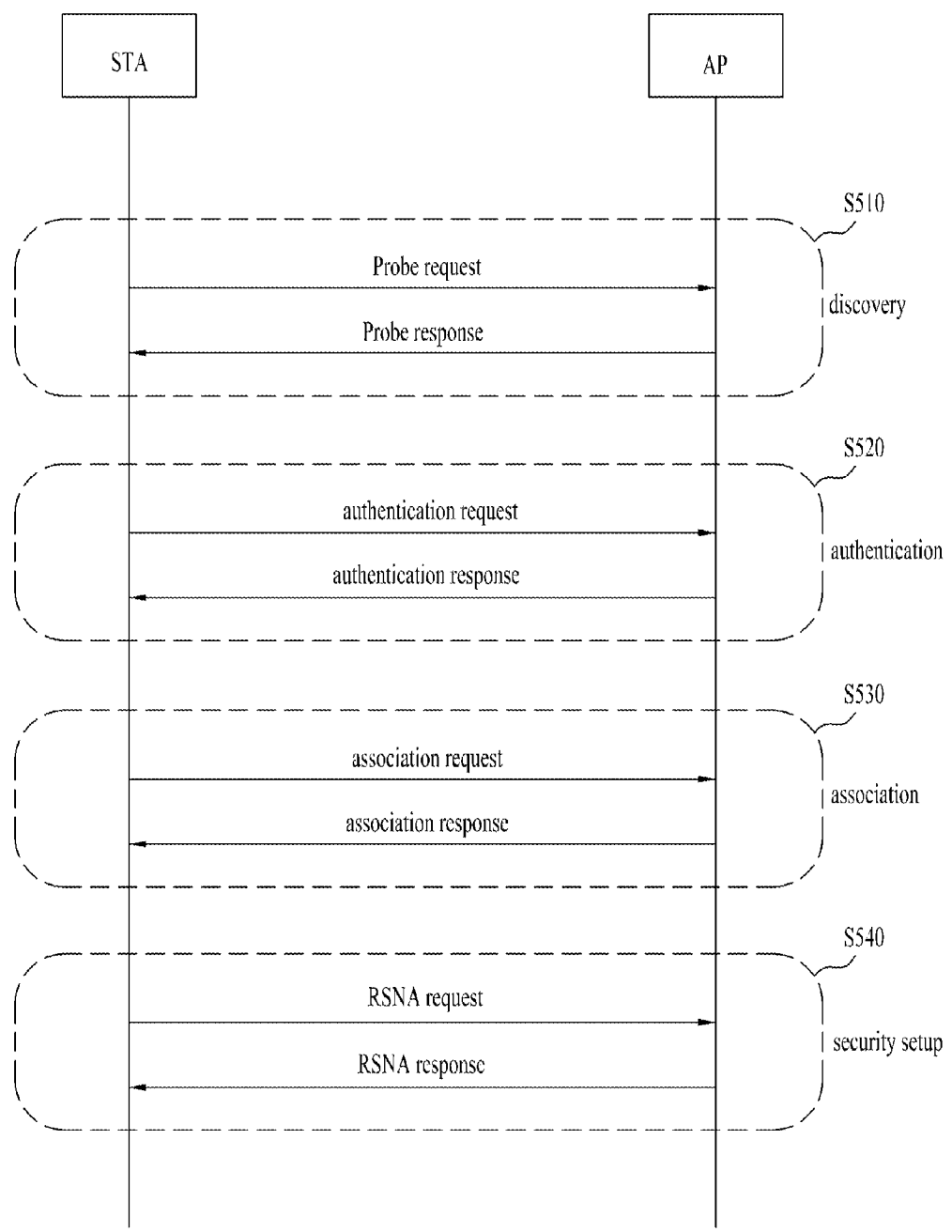
FIG. 5 illustrates a link setup process in a WLAN system.

FIG. 5 illustrates a general link setup process.

To set up a link with respect to the network and transmit/receive data over the network, the STA should perform network discovery and authentication, establish association, and perform an authentication procedure for security. The link setup process may also be referred to as a session initiation process or a session setup process. In addition, the discovery, authentication, association, and security setup steps in the link setup process may be collectively called an association step in a general sense.

Hereinafter, an exemplary link setup process will be described with reference to FIG. 5.

In step S510, an STA may perform the network discovery operation. The network discovery operation may include a scanning operation of the STA. That is, the STA needs to search for an available network so as to access the network. The STA needs to identify a compatible network before participating in a wireless network. Herein, the process of identifying a network contained in a specific region is referred to as scanning.

The scanning operation is classified into active scanning and passive scanning.

FIG. 5 exemplarily shows the network discovery operation including the active scanning process. In the case of active scanning, an STA configured to perform scanning transmits a probe request frame and waits for a response to the probe request frame, in order to move between channels and search for nearby APs. A responder transmits a probe response frame to the STA having transmitted the probe request frame, in response to the probe request frame. Herein, the responder may be the last STA that has transmitted a beacon frame in a BSS of the scanned channel. In the BSS, the AP transmits a beacon frame, and thus the AP serves as the responder. In the IBSS, STAs within the IBSS transmit a beacon frame in rotation, and thus the responder is not fixed. For example, the STA that has transmitted the probe request frame on Channel #1 and has received the probe response frame on Channel #1 may store BSS-related information that is contained in the received probe response frame and move to the next channel (for example, Channel #2) to perform scanning (i.e., transmission/reception of a probe request/response on Channel #2) in the same manner.

Although not shown in FIG. 5, scanning may be carried out in the passive scanning manner. In performing the passive scanning operation, an STA to perform scanning waits for a beacon frame while moving from one channel to another. The beacon frame, which is one of the management frames in IEEE 802.11, is periodically transmitted to inform of presence of a wireless network and to allow the STA performing scanning to find a wireless network and participate in the wireless network. In a BSS, the AP periodically transmits the beacon frame. In an IBSS, STAs of the IBSS transmit the beacon frame in rotation. When an STA performing scanning receives a beacon frame, the STA stores information about the BSS contained in the beacon frame and moves to the next channel. In this manner, the STA records beacon frame information received on each channel. The STA having received a beacon frame stores BSS-related information contained in the received beacon frame, and then moves to the next channel and performs scanning in the same manner.

In comparison between active scanning and passive scanning, active scanning is more advantageous than passive scanning in terms of delay and power consumption.

After the STA discovers the network, the STA may perform authentication in step S520. This authentication process may be referred to as first authentication, which is clearly distinguished from the security setup operation of step S540, which will be described later.

The authentication process may include transmitting, by the STA, an authentication request frame to an AP and transmitting, by the AP, an authentication response frame to the STA in response to the authentication request frame. The authentication frame used in transmitting an authentication request/response may correspond to a management frame.

The authentication frame may contain information about an authentication algorithm number, an authentication transaction sequence number, a status code, a challenge text, a robust security network (RSN), a finite cyclic group, etc. This information, which is an example of information that may be contained in the authentication request/response frame, may be replaced with other information, or include additional information.

The STA may transmit an authentication request frame to the AP. The AP may determine whether to authenticate the STA on the basis of the information contained in the received authentication request frame. The AP may provide an authentication result to the STA through the authentication response frame.

After the STA is successfully authenticated, the association process may be conducted in step S530. The association process may include transmitting, by the STA, an association request frame to the AP and transmitting, by the AP, an association response frame to the STA in response.

For example, the association request frame may include information related to various capabilities, a beacon listening interval, a service set identifier (SSID), supported rates, supported channels, RSN, mobility domain, supported operating classes, a traffic indication map (TIM) broadcast request, an interworking service capability, etc.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), mobility domain, a timeout interval (association comeback time), an overlapping BSS scan parameter, a TIM broadcast response, a QoS map, etc.

The aforementioned information, which corresponds to some parts of information which can be contained in the association request/response frame, may be replaced with other information or include additional information.

After the STA is successfully associated with the network, the security setup process may be performed in step S540. The security setup process of step S540 may be referred to as an authentication process based on a robust security network association (RSNA) request/response. The authentication process of step S520 may be referred to as a first authentication process, and the security setup process of step S540 may be simply referred to as an authentication process.

The security setup process of step S540 may include, for example, a process of performing private key setup based on 4-way handshaking through an extensible authentication protocol over LAN (EAPOL) frame. In addition, the security setup process may be performed using another security scheme that is not defined in IEEE 802.11 standards.

Evolution of WLAN

In order to overcome a limit in WLAN communication speed, IEEE 802.11n has recently been established as a communication standard. IEEE 802.11n aims to increase network speed and reliability as well as to extend wireless network coverage. More specifically, IEEE 802.11n supports a high throughput (HT) of a maximum data processing speed of 540 Mbps, and is based on multiple input multiple output (MIMO) technology in which multiple antennas are used at both a transmitter and a receiver.

With widespread use of WLAN technology and diversification of WLAN applications, there has been a need for development of a new WLAN system capable of supporting higher throughput than a data processing speed supported by IEEE 802.11n. The next generation WLAN system for supporting very high throughput (VHT) is the next version (for example, IEEE 802.11ac) of the IEEE 802.11n WLAN system, and is one of IEEE 802.11 WLAN systems recently proposed to support a data processing speed greater than or equal to 1 Gbps at a MAC service access point (MAC SAP). To this end, VHT systems provide a channel bandwidth of 80 MHz or 160 MHz and up to 8 spatial streams. When a channel bandwidth of 160 MHz, 8 spatial streams, 256 QAM (Quadrature Amplitude Modulation) and a short guard interval (short GI) are all implemented, a transmission rate of up to 6.9 Gbps is provided.

In order to efficiently utilize a radio frequency channel, the next generation WLAN system supports a Multi User Multiple Input Multiple Output (MU-MIMO) transmission scheme in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace is under discussion. For example, a technology for introducing the WLAN system in TV whitespace (TV WS) such as a frequency band (e.g., a band between 54 MHz and 698 MHz) left idle due to transition from analog TV to digital TV has been discussed under the IEEE 802.11af standard. However, this is simply illustrative, and the whitespace may be viewed as a licensed band which is primarily usable by a licensed user. The licensed user means a user who has permission to use the licensed band, and may also be referred to as a licensed device, a primary user, an incumbent user, or the like.

For example, an AP and/or STA operating in the whitespace (WS) should provide a function of protecting the licensed user. For example, in the case in which a licensed user such as a microphone is already using a specific WS channel which is in a frequency band divided according to a regulation to have a specific bandwidth in the WS band, the AP and/or STA are not allowed to use the frequency band corresponding to the WS channel in order to protect the licensed user. In addition, the AP and/or STA should stop using a frequency band for transmission and/or reception of a current frame when the licensed user uses this frequency band.

Accordingly, the AP and/or STA need to pre-check whether use of a specific frequency band within the WS band is possible, namely whether a licensed user is in the frequency band. Checking whether a licensed user is in the specific frequency band is referred to as spectrum sensing. An energy detection scheme, a signature detection scheme and the like are utilized as the spectrum sensing mechanisms. The AP and/or STA may determine that a licensed user is using the specific frequency band if the intensity of a received signal exceeds a predetermined value, or when a DTV preamble is detected.

Machine-to-machine (M2M) communication technology has been discussed as a next generation communication technology. Technical standard IEEE 802.11ah to support M2M communication in the IEEE 802.11 WLAN system is also under development. M2M communication, which represents a communication scheme involving one or more machines, may also be referred to as machine type communication (MTC) or machine-to-machine (M2M) communication. Herein, the machine may represent an entity that does not require direct manipulation from or intervention of a user. For example, not only a meter or vending machine equipped with a wireless communication module, but also user equipment such as a smartphone which is capable of performing communication by automatically accessing the network without manipulation/intervention by the user may be an example of the machines. M2M communication may include device-to-device (D2D) communication and communication between a device and an application server. As examples of communication between a device and an application server, there may be communication between a vending machine and an application server, communication between a Point of Sale (POS) device and an application server, and communication between an electric meter, a gas meter or a water meter and an application server. M2M communication-based applications may include security, transportation and healthcare applications. Considering the characteristics of the aforementioned application examples, M2M communication needs to support occasional transmission/reception of a small amount of data at a low speed in an environment including a large number of devices.

Specifically, M2M communication needs to support a large number of STAs. While the current WLAN system assumes that one AP is associated with up to 2007 STAs, various methods to support other cases in which many more STAs (e.g., about 6000 STAs) are associated with one AP have been discussed regarding M2M communication. In addition, it is expected that there will be many applications to support/require a low transfer rate in M2M communication. In order to smoothly support many STAs, an STA in the WLAN system may recognize presence or absence of data to be transmitted thereto on the basis of a traffic indication map (TIM), and several methods to reduce the bitmap size of the TIM have been under discussion. In addition, it is expected that there will be much traffic data having a very long transmission/reception interval in M2M communication. For example, in M2M communication, a very small amount of data such as electric/gas/water metering is required to be transmitted and received at long intervals (for example, every month). Accordingly, methods have been discussed to efficiently support the case in which a very small number of STAs have a data frame to receive from the AP during one beacon period while the number of STAs to be associated with one AP increases in the WLAN system.

As described above, WLAN technology is rapidly evolving, and not only the aforementioned exemplary techniques but also other techniques for direct link setup, improvement of media streaming throughput, support of high-speed and/or large-scale initial session setup, and support of an extended bandwidth and operation frequency are under development.

Medium Access Mechanism

In the IEEE 802.11-based WLAN system, a basic access mechanism of medium access control (MAC) is a Carrier Sense Multiple Access with Collision Avoidance (CSMA/CA) mechanism. The CSMA/CA mechanism, which is also called a Distributed Coordination Function (DCF) of IEEE 802.11 MAC, basically employs a "listen before talk" access mechanism. In accordance with this access mechanism, the AP and/or STA may perform Clear Channel Assessment (CCA) of sensing a radio frequency channel or medium in a predetermined time interval (e.g., DCF Inter-Frame Space (DIFS)), prior to data transmission. When it is determined in the sensing that the medium is in the idle state, frame transmission begins through the medium. On the other hand, when it is sensed that the medium is in the occupied state, the AP and/or STA does not start transmission, but establishes a delay time (e.g., a random backoff period) for medium access, and attempts to perform frame transmission after waiting during the period. Through application of a random backoff period, it is expected that multiple STAs will attempt to start frame transmission after waiting for different times, resulting in minimized collision.

In addition, the IEEE 802.11 MAC protocol provides a hybrid coordination function (HCF). HCF is based on the DCF and the point coordination function (PCF). PCF refers to a polling-based synchronous access scheme in which polling is periodically executed to allow all reception APs and/or STAs to receive a data frame. In addition, the HCF includes enhanced distributed channel access (EDCA) and HCF controlled channel access (HCCA). EDCA is achieved when the access scheme provided to multiple users by a provider is based on contention. HCCA is achieved in the contention-free channel access scheme which employs the polling mechanism. In addition, the HCF includes a medium access mechanism for improving Quality of Service (QoS) of the WLAN, and may transmit QoS data during both the contention period (CP) and the contention free period (CFP).

Figure 6:
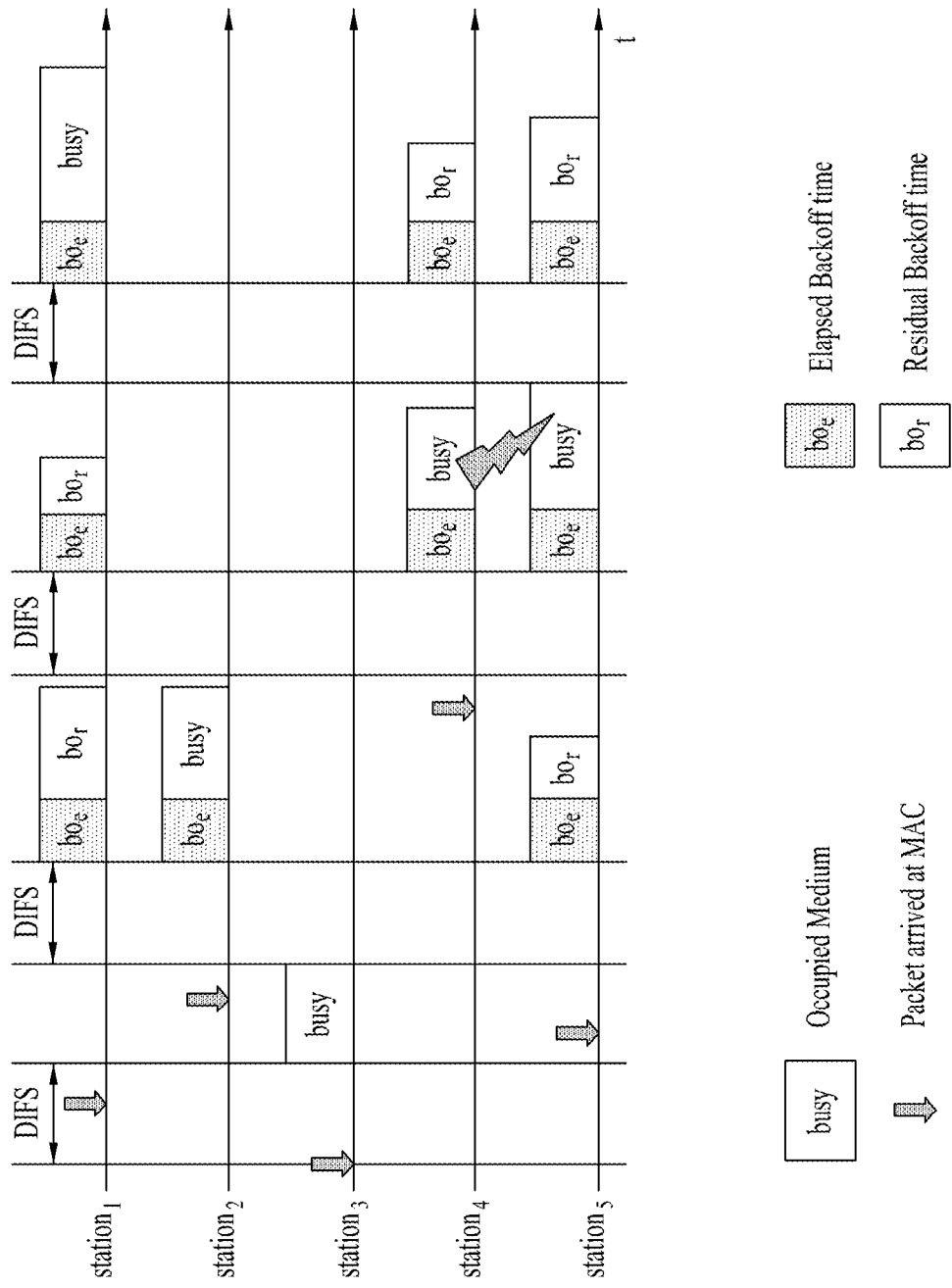
FIG. 6 illustrates a backoff process.

FIG. 6 illustrates a backoff process.

Hereinafter, operations based on a random backoff period will be described with reference to FIG. 6. If the medium is switched from the occupied or busy state to the idle state, several STAs may attempt to transmit data (or frames). In a method to minimize collisions, each STA selects a random backoff count, waits for a slot time corresponding to the selected backoff count, and then attempts to start transmission. The random backoff count has a value of a pseudo-random integer, and may be set to a value in a range between 0 and CW. Herein, CW is a contention window parameter value. Although the CW parameter is given CWmin as the initial value, the initial value may be doubled if transmission fails (for example, if ACK of the transmission frame is not received). If the CW parameter value is CWmax, CWmax is maintained until data transmission is successful, and at the same time data transmission may be attempted. If data transmission is successful, the CW parameter value is reset to CWmin. Preferably, the values of CW, CWmin, and CWmax are set to 2n−1 (where n=0, 1, 2, . . . ).

Once the random backoff process begins, the STA continuously monitors the medium while counting down the backoff slot according to a determined backoff count value. If the medium is monitored as being in the occupied state, the STA stops the countdown and waits for a predetermined time. If the medium is in the idle state, the remaining countdown resumes.

In the example shown in FIG. 6, if a packet for STA3 to transmit reaches MAC of STA3, the STA3 may confirm that the medium is in the idle state in the DIFS and immediately transmit a frame. In the meantime, the other STAs monitor the busy state of the medium, and operate in the standby mode. During operation of STA3, each of STA1, STA2, and STA5 may have data to be transmitted. If the idle state of the medium is monitored, each of STA1, STA2, and STA5 waits for the DIFS time and then performs countdown of the backoff slot according to a random backoff count value which they have selected. In the example shown in FIG. 6, STA2 selects the lowest backoff count value and STA1 selects the highest backoff count value. That is, when the STA2 starts data transmission after completing backoff counting, the residual backoff time of STA5 is shorter than the residual backoff time of STA1. Each of STA1 and STA5 temporarily stops countdown and waits while STA2 occupies the medium. When occupancy by the STA2 is terminated and the medium returns to the idle state, each of STA1 and STA5 waits for a predetermined DIFS time, and restarts backoff counting. That is, after the residual backoff slot as long as the residual backoff time is counted down, frame transmission may start. Since the residual backoff time of STA5 is shorter than that of STA1, STA5 starts frame transmission. Meanwhile, STA4 may be given data to be transmitted while STA2 occupies the medium. In this case, when the medium is in the idle state, STA4 may wait for the DIFS time, perform countdown according to the random backoff count value selected by the STA4, and then start frame transmission. FIG. 6 exemplarily illustrates a case in which the residual backoff time of STA5 is equal to the random backoff count value of STA4 by chance. In this case, collision may occur between STA4 and STA5. If collision occurs between STA4 and STA5, neither STA4 nor STA5 receives ACK, and accordingly data transmission fails. In this case, each of STA4 and STA5 may double the CW value, select a random backoff count value and then perform countdown. Meanwhile, STA1 waits while the medium is in the occupied state due to transmission operation by STA4 and STA5. In this case, when the medium returns to the idle state, STA1 waits for the DIFS time, and then starts frame transmission after lapse of the residual backoff time.

Sensing Operation of STA

As described above, the CSMA/CA mechanism includes not only physical carrier sensing through which the AP and/or STA directly sense the medium, but also virtual carrier sensing. The virtual carrier sensing is performed to address some problems (such as a hidden node problem) encountered in medium access. In the virtual carrier sensing, MAC of the WLAN system may use a network allocation vector (NAV). By means of the NAV value, the AP and/or STA which is using the medium or has authority to use the medium indicates, for another AP and/or another STA, the remaining time before a time at which the medium becomes available. Accordingly, the NAV value may correspond to a reserved period during which the medium is used by the AP and/or STA to transmit a frame. An STA having received the NAV value may be prohibited from accessing the medium during the corresponding period. For example, NAV may be set according to the value of the duration field in the MAC header of a frame.

A robust collision detection mechanism has been introduced to reduce the probability of such collision. Hereinafter, this mechanism will be described with reference to FIGS. 7 and 8. The actual carrier sensing range may not be identical to the transmission range, but for simplicity of description, it will be assumed that the actual carrier sensing range is identical to the transmission range.

Figure 7:
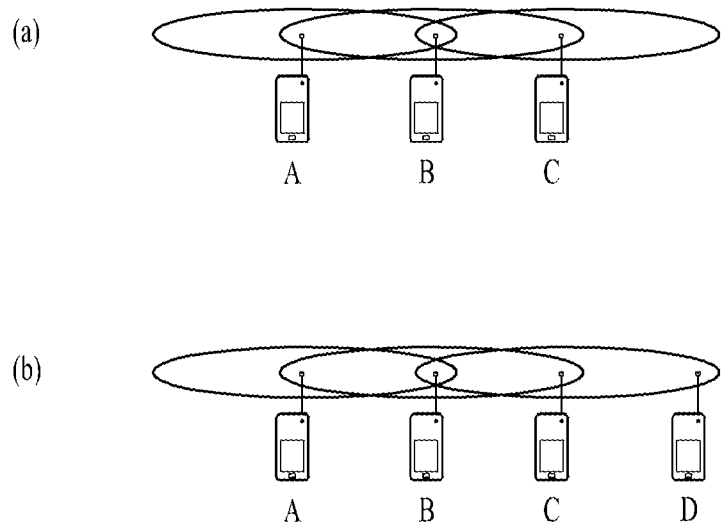
FIG. 7 illustrates a hidden node and an exposed node.

FIG. 7 illustrates a hidden node and an exposed node.

FIG. 7(a) exemplarily shows a hidden node. In FIG. 7(a), STA A communicates with STA B, and STA C has information to be transmitted. Specifically, when STA C performs carrier sensing prior to transmission of data to STA B, STA C may determine that the medium is in the idle state even in a situation in which STA A is transmitting information to STA B. This is because transmission by STA A (i.e., occupied medium) may not be sensed at the location of STA C. In this case, collision may occur since STA B receives information of STA A and information of STA C simultaneously. In this case, STA A may be considered a hidden node of STA C.

FIG. 7(b) exemplarily shows an exposed node. In FIG. 13(b), STA C has information to be transmitted to STA D in a situation in which STA B is transmitting data to STA A. In this case, STA C may perform carrier sensing and determine that the medium is occupied due to transmission of STA B. Therefore, although STA C has information to be transmitted to STA D, STA C should wait until the medium switches back to the idle state since the occupied state of the medium is sensed. However, since STA A is actually located out of the transmission range of STA C, transmission from STA C may not collide with transmission from STA B in view of STA A, and STA C unnecessarily waits until STA B stops transmission. In this case, STA C may be viewed as an exposed node of STA B.

Figure 8:
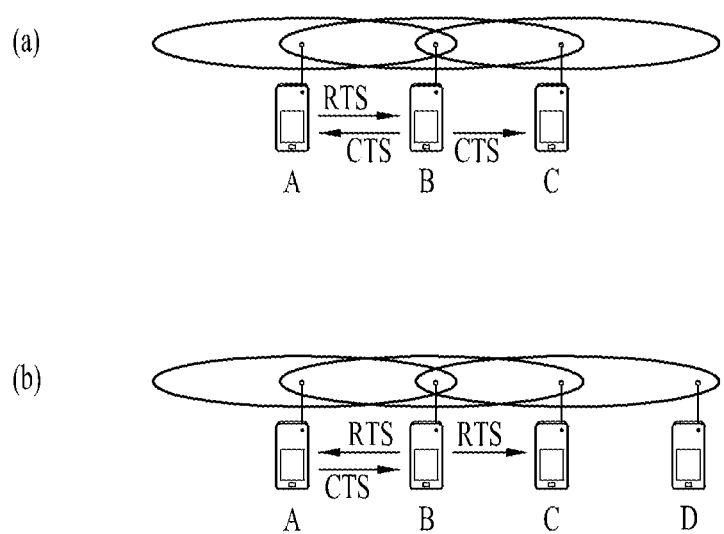
FIG. 8 illustrates RTS and CTS.

FIG. 8 illustrates RTS and CTS.

In order to efficiently use the collision avoidance mechanism in an exemplary situation as shown in FIG. 7, short-signaling packets such as RTS (request to send) and CTS (clear to send) may be used. RTS/CTS between two STAs may be overheard by nearby STA(s), such that the nearby STA(s) may consider whether information is communicated between the two STAs. For example, if an STA to transmit data transmits an RTS frame to another STA that is to receive data, the STA to receive data may transmit a CTS frame to nearby STAs, thereby informing the nearby STAs that the STA is about to receive data.

FIG. 8(a) exemplarily shows a method to solve the hidden node problem. The method assumes a situation in which both STA A and STA C attempt to transmit data to STA B. If STA A transmits RTS to STA B, STA B transmits CTS to both STA A and STA C located around STA B. As a result, STA C waits until STA A and STA B stop data transmission, and thus collision is avoided.

FIG. 8(b) exemplarily shows a method to solve the exposed node problem. STA C may overhear RTS/CTS transmission between STA A and STA B, thereby determining that no collision will occur when it transmits data to another STA (e.g., STA D). That is, STA B may transmit RTS to all the nearby STAs, and transmits CTS only to STA A which actually has data to transmit. Since STA C receives only the RTS, but fails to receive the CTS of STA A, STA C may recognize that STA A is located out of the carrier sensing range of STA C.

Power Management

As described above, STAs in the WLAN system should perform channel sensing before they perform transmission/reception operation. Persistently performing channel sensing causes persistent power consumption of the STA. There is not much difference in power consumption between the reception state and the transmission state, and continuous maintenance of the reception state may cause large load to STAs which are provided with limited power (i.e., operated by a battery). Therefore, if an STA maintains the reception standby mode so as to persistently sense the channel, power is inefficiently consumed without special advantages in terms of WLAN throughput. To address this problem, the WLAN system supports a power management (PM) mode of the STA.

The PM mode of the STA is classified into an active mode and a power save (PS) mode. The STA is basically operated in the active mode. The STA operating in the active mode maintains an awake state. When the STA is in the awake state, the STA may normally perform frame transmission/ reception, channel scanning, or the like. On the other hand, the STA in the PS mode operates by switching between the sleep state (or doze state) and the awake state. The STA in the sleep state operates with minimum power and performs neither frame transmission/reception nor channel scanning.

As the time for which the STA operates in the sleep state increases, power consumption of the STA is reduced, and accordingly the STA operation duration increases. However, since transmission or reception of the frame is not allowed in the sleep state, the STA cannot unconditionally operate in the sleep state for a long time. When the STA operating in the sleep state has a frame to transmit to the AP, it may be switched to the awake state to transmit/receive the frame. On the other hand, when the AP has a frame to transmit to the STA which is in the sleep state, the STA cannot receive the frame nor recognize the presence of the frame. Accordingly, in order to recognize presence or absence of a frame to be transmitted to the STA (or in order to receive the frame if the frame is present), the STA may need to switch to the awake state according to specific periodicity.

Figure 9:
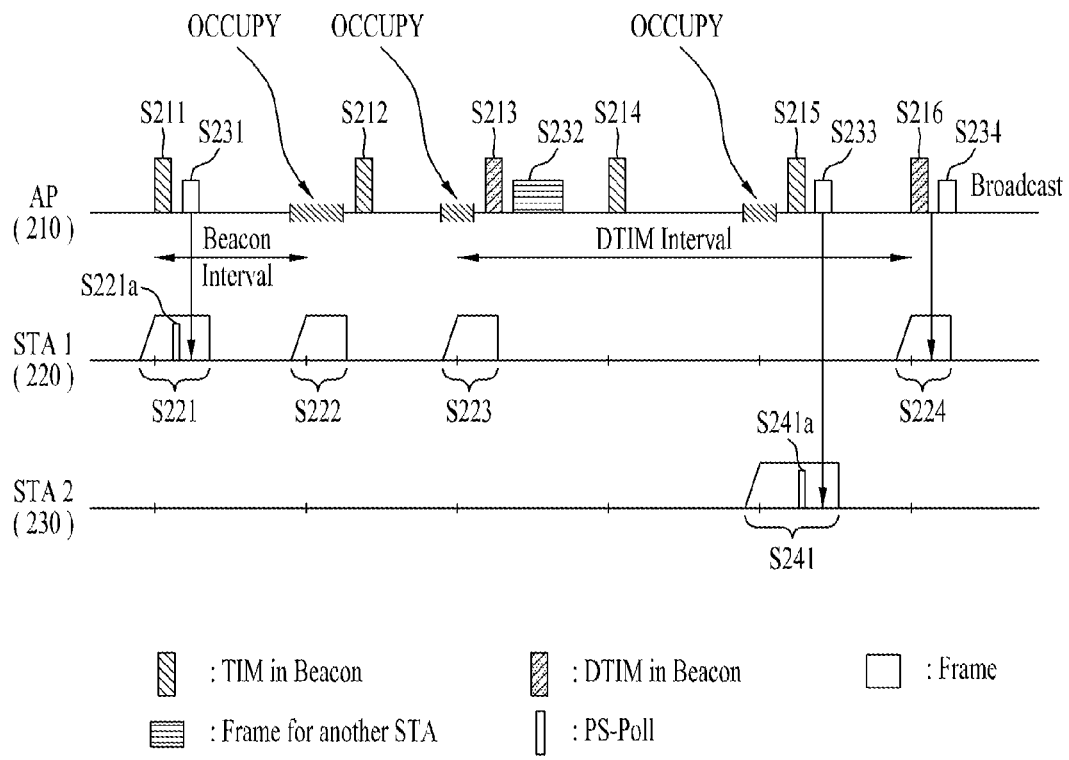
FIG. 9 illustrates a power management operation.

FIG. 9 illustrates a power management operation.

Referring to FIG. 9, AP 210 transmits a beacon frame to STAs present in the BSS at predetermined time intervals (S211, S212, S213, S214, S215 and S216). The beacon frame includes a traffic indication map (TIM) information element. The TIM information element contains information indicating that the AP 210 has buffered traffic for the STAs associated with the AP 210 and that a frame will be transmitted. The TIM element includes a TIM used to inform of a unicast frame and a delivery traffic indication map (DTIM) used to inform of a multicast or broadcast frame.

AP 210 may transmit a DTIM once per three transmissions of the beacon frame. STA1 220 and STA2 222 are STAs operating in the PS mode. Each of STA1 220 and STA2 222 may be switched from the sleep state to the awake state at every wakeup interval of a predetermined period to receive the TIM element transmitted by the AP 210. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 220 can switch to the awake state at every beacon interval to receive the TIM element. Accordingly, when AP 210 transmits the beacon frame for the first time (S211), STA1 220 may switch to the awake state (S221). Thereby, STA1 220 may receive the beacon frame and acquire the TIM element. If the acquired TIM element indicates that there is a frame to be transmitted to STA1 220, STA1 220 may transmit a power save (PS)-Poll frame, which requests transmission of the frame, to the AP 210 (S221a). In response to the PS-Poll frame, the AP 210 may transmit the frame to STA 1 220 (S231). After completing reception of the frame, STA1 220 is switched back to the sleep state and operates in the sleep state.

When the AP 210 transmits the beacon frame for the second time, the medium is in the busy state in which the medium is accessed by another device, and accordingly the AP 210 may not transmit the beacon frame at the correct beacon interval, but may transmit the beacon frame at a delayed time (S212). In this case, STA1 220 is switched to the awake state in accordance with the beacon interval, but does not receive the beacon frame whose transmission is delayed, and is thus switched back to the sleep state (S222).

When the AP 210 thirdly transmits the beacon frame, the beacon frame may include a TIM element set to a DTIM. However, since the medium is in the busy state, the AP 210 transmits the beacon frame at a delayed time (S213). STA1 220 may be switched to the awake state in accordance with the beacon interval and acquire the DTIM through the beacon frame transmitted by the AP 210. It is assumed that the DTIM acquired by STA1 220 indicates that there is no frame to be transmitted to STA1 220, but there is a frame for another STA. In this case, STA1 220 may confirm that there is no frame to receive and switch back to the sleep state to operate in the sleep state. After transmission of the beacon frame, the AP 210 transmits the frame to the corresponding STA (S232).

The AP 210 fourthly transmits the beacon frame (S214). STA1 220 may adjust the wakeup interval for reception of the TIM element since it has failed to acquire information indicating presence of buffered traffic for STA1 220 through the previous two operations of reception of the TIM element. Alternatively, provided that signaling information for adjustment of the value of the wakeup interval of STA1 220 is contained in the beacon frame transmitted by the AP 210, the wakeup interval value of the STA1 220 may be adjusted. In this example, STA1 220 may be set to be switched to the awake state once at every three beacon intervals to receive a TIM element, rather than being set to be switched between the operating states at every beacon interval. Therefore, when the AP 210 fifthly transmits the beacon frame (S215) after the fourth transmission of the beacon frame (S214), STA1 220 remains in the sleep state, and thus cannot acquire the corresponding TIM element.

When AP 210 sixthly transmits the beacon frame (S216), STA1 220 may be switched to the awake state and acquire the TIM element contained in the beacon frame (S224). Since the TIM element is a DTIM indicating presence of a broadcast frame, STA1 220 may receive the broadcast frame transmitted by the AP 210 without transmitting a PS-Poll frame to the AP 210 (S234). In the meantime, the wakeup interval set for STA2 230 may have a longer period than the wakeup interval of STA1 220. Accordingly, STA2 230 is switched to the awake state at a time point (S215) when the AP 210 fifthly transmits the beacon frame, such that the STA2 230 may receive the TIM element (S241). STA2 230 may recognize presence of a frame to be transmitted thereto through the TIM element and transmit the PS-Poll frame to the AP 210 in order to request frame transmission (S241a). The AP 210 may transmit a frame to STA2 230 in response to the PS-Poll frame (S233).

In order to operate/manage the PS mode as shown in FIG. 9, the TIM element includes a TIM indicating presence or absence of a frame to be transmitted to the STA or a DTIM indicating presence or absence of a broadcast/multicast frame. The DTIM may be implemented through field setting for the TIM element.

Figure 10:
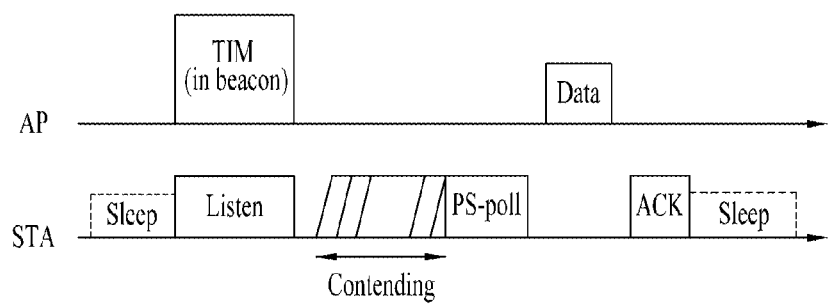

FIGS. 10 to 12 illustrate operations of an STA having received a TIM in detail.

Referring to FIG. 10, an STA is switched from the sleep state to the awake state to receive the beacon frame including a TIM from the AP. The STA may recognize presence of buffered traffic to be transmitted thereto by interpreting the received TIM element. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit a data frame to the STA. The STA may receive the data frame and transmit an ACK frame to the AP in response to the received data frame. Thereafter, the STA may switch back to the sleep state.

As shown in FIG. 10, the AP may operate in a manner of immediate response in which the AP transmits the data frame when a predetermined time (e.g., a short inter-frame space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 11.

In the example of FIG. 11, the operations of the STA of switching from the sleep state to the awake state, receiving a TIM from the AP, and transmitting the PS-Poll frame to the AP through contention are identical to those in the example of FIG. 10. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 12 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

Frame Structure

PPDU (physical layer convergence protocol (PLCP) packet data unit) frame format used by IEEE 802.11 system can be configured by including STF (short training field), LTF (long training field), SIG (signal) field and data field. A most basic PPDU frame format (e.g., non-HT (high throughput) PPDU frame format) may be configured with L-STF (Legacy-STF), L-LTF (Legacy-LTF), SIG field and data field only. Moreover, depending on a type (e.g., HT-mixed format PPDU, HT-greenfield format PPDU, VHT (very high throughput) PPDU, etc.) of PPDU frame format, additional STF, additional LTF and additional SIG field (or, different types of STF, LTF and SIG field) may be included between the SIG field and the data field.

STF is a signal for signal detection, AGC (automatic gain control), diversity selection, precise time synchronization and the like. LTF is a signal for channel estimation, frequency error estimation, and the like. STF and LTF may be combined together to be named PCLP preamble. And, the PLCP preamble may be called a signal for synchronization of OFDM physical layer and channel estimation.

SIG field may include RATE field, LENGTH field and the like. RATE field may include information on modulation and coding rage of data. LENGTH field may include information on a length of data. In addition, SIG field may include parity bit, SIG TAIL bit and the like.

Data field may include SERVICE field, PSDU (PLCP service data unit) and PPDU TAIL bit and may further include padding bits if necessary. Some bits of SERVICE field may be used for synchronization of a descrambler in a receiving stage. PSDU corresponds to MAC PDU (protocol data unit) defined in MAC layer and may include data generated/used from/in an upper layer. PPDU TAIL bit may be used to return an encoder to a zero (0) state. Padding bits may be used to match a length of the data field to prescribed units.

MAC header includes Frame Control field, Duration/ID field, Address field and the like. Frame Control field may include control informations required for frame transmission/reception. Duration/ID field may be set to a time for transmitting a corresponding frame and the like. Details of Sequence Control subfield, QoS Control subfield and HT Control subfield of MAC header can refer to IEEE 802.11-2012 Standard Documents.

Frame Control field of MAC header may include such subfields as Protocol Version, Type, Subtype, To DS, From DS, More Fragment, Retry, Power Management, More Data, Protected Frame, and Order. Contents of the respective subfields of Frame Control field can refer to IEEE 802.11-2012 Standard Documents.

Meanwhile, a null-data packet (NDP) frame format means a frame format of a type failing to include data packet. In particular, NDP frame means a frame format that includes PLCP header part (i.e., STF, LTF and SIG field) only in a general PPDU format without including the rest part (i.e., data field). NDP frame may be named a short frame format.

Wakeup Polling Scheme

The present invention proposes that a user equipment (or STA) transmits a wakeup poll frame to an AP at the timing point of waking up from a sleep state.

In particular, according to the scheme described with reference to FIG. 9, when a user equipment wakes up from a sleep state, it should receive a beacon frame all the time in order to check a presence or non-presence of data to receive from an AP. Yet, unlike such a scheme, a user equipment transmits a wakeup poll frame to an AP at a wakeup timing point without receiving a beacon frame in order to ask the AP whether the user equipment can continue to sleep, whether the user equipment should be in awake state, how long the user equipment should sleep if sleeping again, how long the user equipment should be in awake state, and the like. This scheme enables the AP to manage PS mode of STAs directly in such an environment as M2M communication.

Hence, although a user equipment set to perform a wakeup polling action fails to hear a beacon (i.e., a frame including TIM) from an AP, since the user equipment can perform a polling, such a user equipment can be named a non-TM STA. Moreover, since the user equipment actively performs the polling action, the wakeup polling action may be named an active polling action.

FIG. 13 is a diagram for one example of a format of a wakeup polling frame.

A frame shown in FIG. 13 may be named a wakeup poll action management frame.

A category field has a size of 1 octet and may be set to a value indicating what kind of category a corresponding frame belongs to.

A wakeup action field has a size of 1 octet and may be set to a value indicating Wakeup Poll.

A dialog token field has a size of 1 octet and may be set to a value selected from non-zero values of non-AP STA in order to identify an exchange between a wakeup poll frame and a wakeup confirm frame.

Optional subelements may be set to a size variable in some cases. For instance, a listen interval field may be included in the optional subelements field. The listen interval field may be a value of a beacon interval unit (i.e., an integer multiple of a beacon interval) and is able to carry a value desired by an STA to change a sleep/awake switch cycle in the future instead of a listen interval value used so far. For instance, in case of M2M sensor user equipment, since variation of a periodically sensed data value is low, if it is determined that there is no problem in setting a sleep time longer statistically, the corresponding user equipment can make a request for a listen interval change to an AP in order to reduce power consumption. In M2M, if a server (or AP) has an authority for the corresponding decision, the above-mentioned listen interval field can be used.

Meanwhile, considering that the objects of a wakeup poll frame are to ask an AP of sleep/awake of a non-AP STAT and to notify the AP that a non-AP STA wakes up now, the optional subelements field may be omitted.

Figures 14, 15:
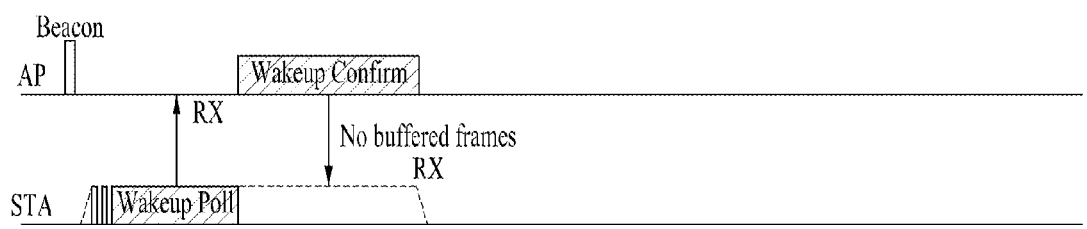
FIG. 14 is a diagram for one example of a format of a wakeup confirm frame.
FIG. 15 is a diagram to describe one example of a wakeup poll action.

FIG. 14 is a diagram for one example of a format of a wakeup confirm frame.

A frame shown in FIG. 14 may be named a wakeup confirm action management frame.

A category field has a size of 1 octet and may be set to a value indicating what kind of category a corresponding frame belongs to.

A wakeup action field has a size of 1 octet and may be set to a value indicating Wakeup Confirm.

A dialog token field has a size of 1 octet and may be set to a value equal to that of the dialog token field of the wakeup poll frame.

An awake duration field has a size of n octets and may be set to a value for an AP to instruct a corresponding STA (i.e., a user equipment having transmitted a wakeup poll frame) to be in awake state during a prescribed time interval from now on. Depending on indicating this value in a prescribed precise time interval, the value n in the size of n octets can be determined. And, a unit of time may be variously set to one of a predefined time unit (TU), a micro-second unit, a slot unit, and the like. If a value of the awake duration field is set to 0, a non-AP STA having received this value can instantly enter the sleep mode again. If this value is not 0, an STA should maintain the awake state to receive an additional message from an AP and is able to enter the sleep mode again from an end timing point of the corresponding time interval.

Optional subelements may be set to a size variable in some cases. For instance, a listen interval field may be included in the optional subelements field. A listen interval field in a wakeup confirm frame may include a listen interval field value, which is included in a wakeup poll frame and desired to change by a non-AP STA, intactly or a value differently determined by an AP. No matter what a value is, in case of receiving this value, an STA should operate in accordance with a corresponding listen interval field value.

In case that the wakeup confirm frame shown in FIG. 14 is sent in response to the wakeup poll frame shown in FIG. 13, the wakeup confirm frame may be construed as the same as transmitting ACK frame in response to a wakeup poll frame. In particular, if an STA receives a wakeup confirm frame, it is unnecessary for an AP to transmit an ACK frame in addition. If the STA fails to receive the wakeup confirm frame normally, the STA should retransmit a wakeup poll frame by regarding ACK for a wakeup poll frame as not received.

FIG. 15 is a diagram to describe one example of a wakeup poll action.

According to the example shown in FIG. 15, while an AP transmits a beacon frame including TIM, an STA in sleep state wakes up at a random timing point and is able to transmit a wakeup poll frame to the AP despite failing to receive a beacon frame. In case that the AP does not have data to transmit to the corresponding STA, the AP informs the STA of 'no buffered frames' using a wakeup confirm frame so that the corresponding STA can enter a sleep mode again. In such a wakeup confirm frame, an awake duration field value may be set to 0, which can be construed as indicating 'no buffered frames'.

Figure 16:
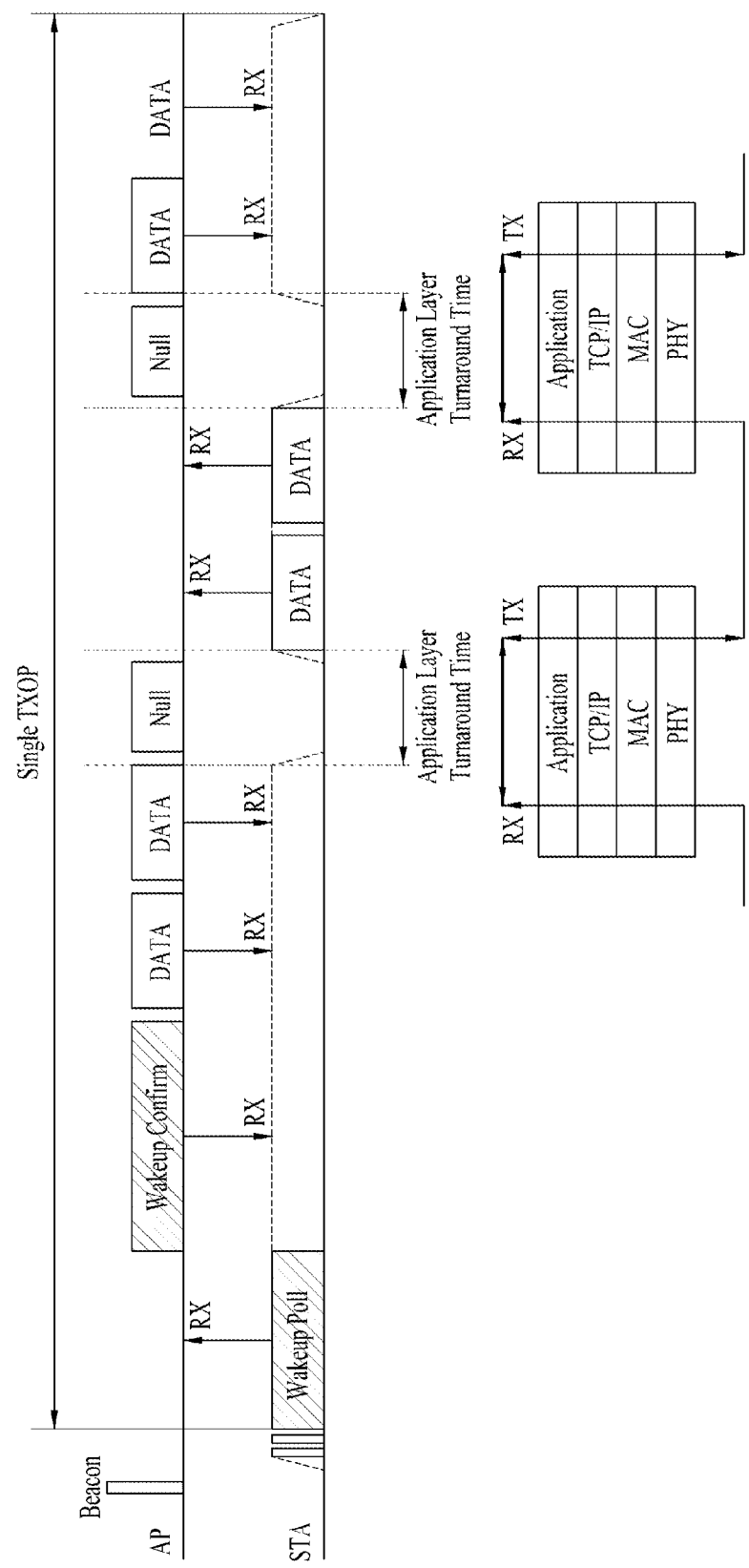
FIG. 16 is a diagram to describe another example of a wakeup poll action.

FIG. 16 is a diagram to describe another example of a wakeup poll action.

According to the example shown in FIG. 16, while an AP transmits a beacon frame including TIM, an STA in sleep state wakes up at a random timing point and is able to transmit a wakeup poll frame to the AP despite failing to receive a beacon frame. In case that the AP has data to transmit to the corresponding STA, the AP can inform the STA of a presence of the data using a wakeup confirm frame. Hence, the STA can perform an operation of exchanging data frames with the AP by maintaining an awake state for prescribed duration.

In particular, an STA awake from a sleep state transmits a wakeup poll frame to an AP. Subsequently, the AP sets a value of an awake duration field of a wakeup confirm frame to a non-zero value and then transmits the wakeup confirm frame, thereby informing the STA that a buffered frame exists in the AP. If a data transmission to the STA from the AP is performed during a transmission opportunity (TXOP) set for the STA (i.e., downlink data transmission), a data transmission from the STA to the AP is performed (i.e., uplink data transmission), and an additional data transmission from the AP to the STA is expected to be performed, the AP can set a value of the awake duration field of the wakeup confirm frame to be long enough to cover a time for completing all the data frame exchanges mentioned in the above description.

Through the awake duration field value set long, the AP can control a specific STA to maintain an awake state as long as a desired time. According to the example shown in FIG. 16, an awake duration field value is set to a time at which a single TXOP interval ends and can be then notified to the STA through a wakeup confirm frame. FIG. 16 shows one example that the AP transmits data frames buffered twice right after the wakeup confirm frame transmission.

Although FIG. 16 fails to show an ACK frame transmission for a data frame, each data frame receiving side can transmit an individual ACK frame to a data transmitting side. And, the data receiving side may transmit a single ACK frame (i.e., a block ACK frame) for a plurality of data frames to the data transmitting side.

In addition, regarding a wakeup poll action and a corresponding data transceiving operation like FIG. 16, as an AP transmits QoS (quality of service) null frame and the like in a single TXOP interval, it is able to support an STA to secure ALTT (application layer turnaround time) for a subsequent data frame transmission.

Referring to FIG. 16, once an STA receives buffered data frames from an AP, the STA requires a processing time until informations carried on the received data frame to arrive at an application layer through PHY layer, MAC layer and TCP/IP (transmission control protocol/internet protocol) layer. After the STA has processed and decrypted the information carried on the received data frame, if the STA intends to transmit a data frame in response to the processing and decryption, the STA requires a processing time until performing a transmission through a radio medium actually through the application layer, the TCP/IP layer, the MAC layer and the PHY layer.

According to the example shown in FIG. 16, such an internal processing time of the STA is denoted by ALTT (application layer turnaround time). In order to prevent a situation that another STA occupies the medium during the ALTT period, the AP transmits a null frame during ALTT so that the single TXOP can be maintained. In particular, another STA hearing the null frame transmitted by the AP sets NAV from the information (e.g., duration information of MAC header) included in the null frame, thereby being able to defer a medium access during the corresponding period.

In aspect of the STA, as the STA receives the null frame, the STA turns off a network card (i.e., an external transceiving device) during the ALTT interval and performs an operation of performing an internal signal processing and the like, whereby an additional power saving effect can be obtained.

By such a method, an AP and an STA can exchange DATA frames several times in a single TXOP. If there is no more DATA frame to be exchanged at a current timing point, the AP transmits a wakeup confirm frame to the STA again but sets an awake duration field value to '0', whereby the single TXOP can be terminated early. Moreover, having received the wakeup confirm frame, the STA can enter a sleep state again.

Alternatively, in order for an AP to enter a sleep state by stopping communication with an STA, when the AP transmits a prescribed frame (e.g., QoS null frame) to the STA, a service period for the STA can be explicitly stop the service period for the STA by setting end of service period (EOSP) in the QoS Control field of the MAC header of the data frame to 1.

Moreover, the setting for the ALTT period can be requested to the AP by the STA. During a sleep state, the STA maintains low power states of a central processing unit (CPU), a memory, an input/output (I/O) device and the like. In doing so, while the STA is operating in low power state, if the STA receives DATA frame, a delay time is required to operate a system in a normal clock cycle.

Since a time taken to normally operate an upper layer function is a value set for each system (i.e., a system-specific parameter), the STA can deliver information on such a parameter to the AP in a manner that the corresponding information is included in capability information.

For instance, when the STA transmits an association request frame, a re-association request frame or the like to the AP, ALTT capability information element can be included therein.

FIG. 17 is a diagram for one example of a format of ALTT information element.

Element ID field has a size of 1 octet and can be set to a value indicating that the corresponding information element (IE) is ALTT IE.

Length field has a size of 1 octet and can be set to a value indicating a length of subsequent field(s).

ALTT field has a size of 1 octet and can be set to an estimated time value taken for an STA to normally operate its application layer system. And, the estimated time value can be represented as a multiple of OFDM symbol duration.

Figure 18:
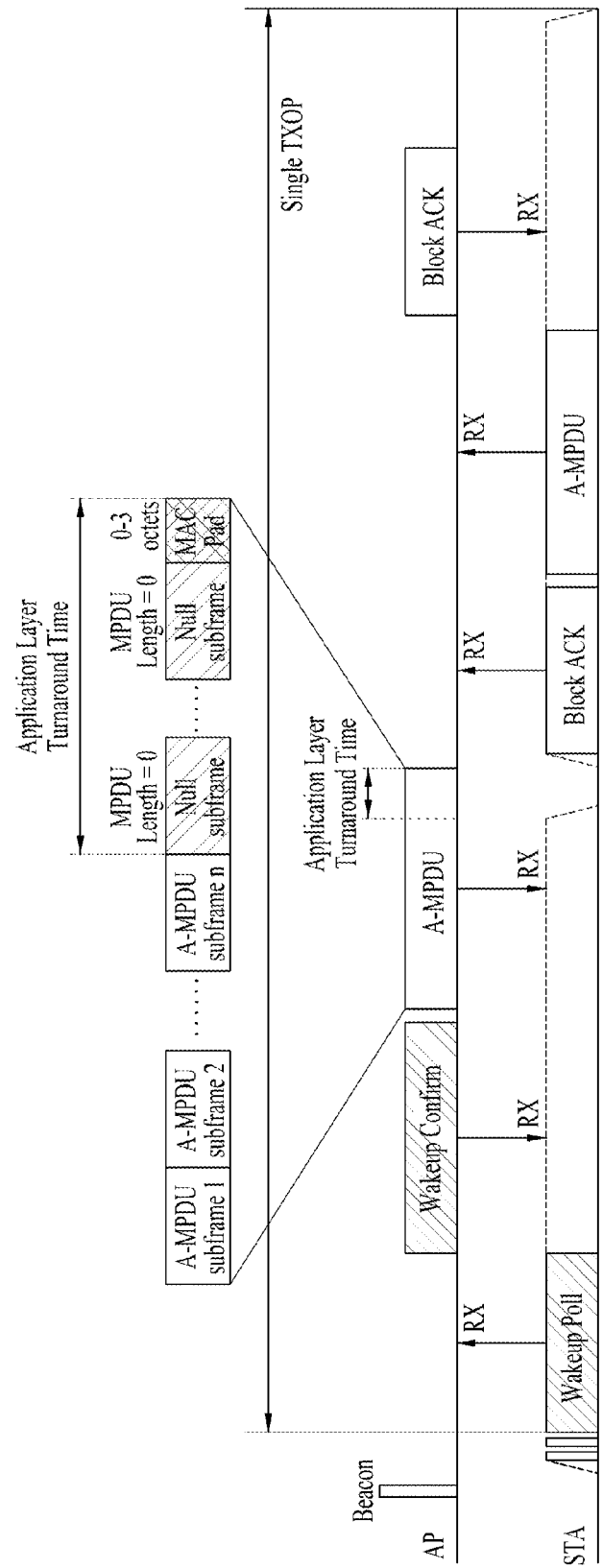
FIG. 18 is a diagram to describe a scheme for using A-MPDU transmission for ALTT protection.

FIG. 18 is a diagram to describe a scheme for using A-MPDU transmission for ALTT protection.

In order to prevent a medium from being occupied by a different STA during ALTT of an STA, an AP can utilize A-MPDU (aggregated Mac protocol data unit) transmission so that a result of CCA performed by the different STA during ALTT can be maintained in busy state.

According to the example shown in FIG. 18, while an AP transmits a beacon frame including TIM, an STA in sleep state can transmit a wakeup poll frame to the AP by waking up at a random timing point despite failing to receive the beacon frame. In response to the wakeup poll frame, the STA can receive a wakeup confirm frame from the AP. If the AP has data to send to the STA, the AP can control the STA to maintain an awake state (or an active state 0 by setting a value of an awake duration field of the wakeup confirm frame to a non-zero value. Subsequently, when the AP transmits a data frame toward the STA, the AP can use A-MPDU frame for the data frame transmission. In doing so, when the AP configures A-MPDU, the AP can pad a null subframe into the A-MPDU in consideration of ALTT of a receiving STA.

The receiving STA can enter a sleep state after the null subframe. At an end timing point of the whole transmission of the A-MPDU, the receiving STA wakes up and is able to transmit a block ACK frame to the AP. After the block ACK frame transmission, if the receiving STA intends to transmit an uplink data frame subsequently, the receiving STA can perform a signaling through the block ACK frame. In particular, the STA indicates a presence or non-presence of a data frame to be sent by the STA using More Data bit in a frame control (FC) field of a MAC header of the block ACK frame. If the corresponding More Data bit is set to 1, it means that there is a data frame to be sent to the AP by the STA. In this case, the STA can transmit the data frame to the AP in continuation with the block ACK frame.

In order for the STA to enter the sleep state again, the AP should end a service period. In particular, in order for the AP to enable the STA to enter the sleep state by interrupting the communication with the STA, end of service period (EOSP) bit in QoS control field of a MAC header of a frame sent to the STA by the AP can be set to 1.

Figure 19:
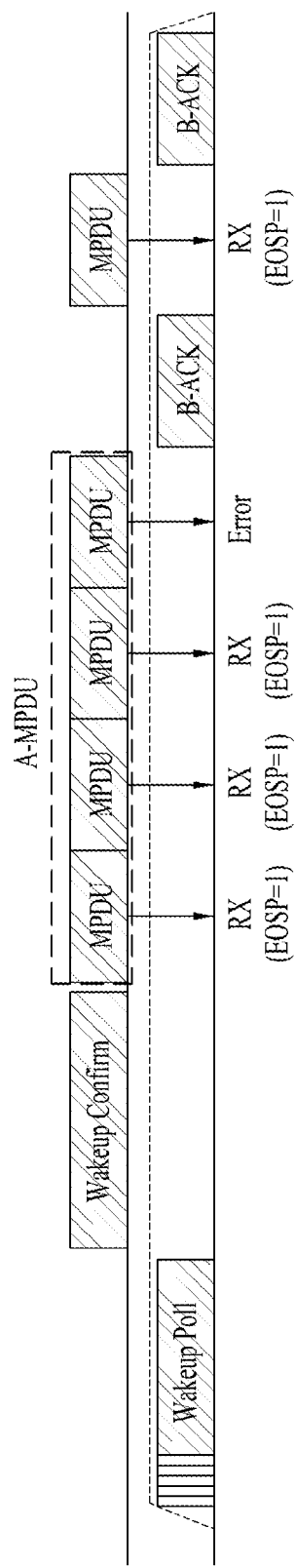
FIG. 19 is a diagram to describe an additional example of a scheme for using A-MPDU transmission for ALTT protection.

FIG. 19 is a diagram to describe an additional example of a scheme for using A-MPDU transmission for ALTT protection.

According to the example shown in FIG. 19, an STA in sleep state wakes up at a random timing point and is then able to transmit a wakeup poll frame to an AP (despite failing to receive a beacon frame). In response to the wakeup poll frame, the STA can receive a wakeup confirm frame from the AP. Subsequently, the AP can transmit downlink BU (buffered unit) in A-MPDU format to the STA.

If the AP has no more downlink BU to transmit to the corresponding STA, as mentioned in the foregoing description of the example shown in FIG. 18, the AP can inform the STA that a service period is ended in a manner of setting a value of EOSP bit field in QoS control field of MAC header of each MPDU included in A-MPDU. Hence, having received a frame having EOSP bit set to 1, the STA can enter the sleep state again in accordance with the end of the service period.

Through the example shown in FIG. 19, the present invention suggests a proposal as follows. First of all, although the EOSP bit of the frame transmitted by the AP is set to 1, if error exists in a portion of A-MPDU received by the STA, the service period is not ended and the STA should not enter the sleep state.

In particular, the reason for the STA to end the service period by setting the value of the EOSP bit field to 1 is that downlink BU to be sent to the STA by the AP does not exist any more. Yet, if error exists in a portion of PPDU carried on A-MPDU, it should be construed as a presence of a frame that should be transmitted by the AP (i.e., error-occurred data is retransmitted). If the STA enters the sleep state despite a presence of error in a portion of the A-MPDU, the STA may not receive the data retransmitted by the AP. Moreover, since the STA enters the sleep state, wakes up, performs a polling again, and then receives a retransmission of the previously failed data, power consumption of the STA may be raised. Hence, in case that error exists in a portion of A-MPDU transmitted by the AP, the STA preferably maintains the wakeup state without entering the sleep state despite that the EOSP bit is set to 1.

After an AP has transmitted a downlink BU in A-MPDU format to an STA, if the AP receives a block ACK from the STA, the AP can confirm that error is occurred in which frame through a bitmap of the block ACK. If at least one error-occurred MPDU exists, the AP does not end a service period but subsequently retransmits the error-occurred MPDU to the corresponding STA (particularly, after SIFS interval from the block ACK received timing point). In this case, the STA does not enter the sleep state, receives the retransmitted error-occurred MPDU successfully, and is then able to enter the sleep state. In addition, if the STA continuously maintains the awake state, it may be difficult to achieve the purpose of the prevention of the power consumption of the STA. Hence, if the STA having delivered the information indicating that the error has been occurred in which frame through the bitmap of the block ACK fails to detect a signal of a retransmitted frame for a prescribed time length (e.g., ACKTimeout=aSIFSTime+aSlotTime+aPHY-RX-START-Delay) (i.e., after standby by maintaining the awake state during the prescribed timeout), the STA can enter the sleep state. In this case, the aSIFSTime means a nominal time required for MAC and PHY to receive a last symbol of a frame on an air interface, to process the corresponding frame and to transmit a $1^{st}$ symbol of a possibly earliest response frame. The aSlotTime is a time unit used by the MAC to define PIFS (point coordination function (PCF) interframe space) and DIFS interval. The aPHY-RX-START-Delay means a delay time delayed until PHY-RXSTART.indication primitive is issued. The PHY-RXSTART.indication primitive is a primitive for the PHY to inform a local MAC that PLCP starts to receive PPDU having valid PLCP header.

According to the embodiments mentioned in the foregoing description, a wakeup poll frame and a wakeup confirm frame are taken as major examples, by which the scope of the present invention is non-limited. For instance, the principles proposed by the present invention are identically applicable to a case that the wakeup poll frame and the wakeup confirm frame are substituted with PS-Poll control frame and ACK control frame, respectively.

According to the embodiments mentioned in the foregoing description, since an AP has no more data to transmit to the STA, it is mainly explained that EOSP bit is set to 1 to end a service period, by which the scope of the present invention is non-limited. For instance, More Data bit of a frame control (FC) field of a MAC header of a prescribed frame can be used instead of the EOSP bit.

For example, if More Data bit of a prescribed frame is set to 1, it means that a frame to be additionally transmitted further exists. If the More Data bit is set to 0, it means that a frame to be additionally transmitted does not exist any more. Hence, in case that an AP performs a transmission by setting More Data bit of a prescribed frame to 0 (e.g., in the example shown in FIG. 19, a case that a value of More Data bit field included in each of a plurality of MPDUs transmitted in A-MPDU), it means that the AP has no more downlink BU to additionally transmit to the corresponding STA, whereby the STA can enter the sleep state. Yet, according to the present invention, if error is occurred in a partial frame of A-MPDU, the STA does not enter the sleep state, transmits block ACK, and stands by for the AP to retransmit the error occurred frame.

Thus, according to the proposal of the present invention, when downlink BU is transmitted in a plurality of frames (e.g., A-MPDU format), in case that a frame to be additionally transmitted after the plurality of frames does not exist (e.g., a case that EOSP bit in the plurality of frames is set to 1, a case that More Data bit is set to 0, etc.), only if the plurality of frames are successfully received, a user equipment can enter a sleep state after transmitting ACK (e.g., block ACK) for the plurality of frames. If error is occurred in at least one of the plurality of frames, the user equipment maintains an awake state without entering the sleep state and is able to wait for retransmission of the error occurred frame(s).

Figure 20:
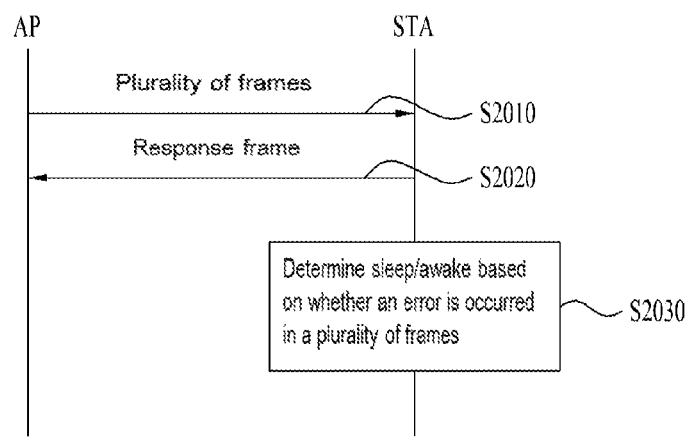
FIG. 20 is a flowchart to describe a method according to one example of the present invention.

FIG. 20 is a flowchart to describe a method according to one example of the present invention.

In a step S2010, an AP can transmit a plurality of frames (e.g., A-MPDU). In particular, after an STA switched to an awake state from a sleep state has transmitted a polling frame (e.g., a wakeup poll frame, PS-Poll frame, etc.) to an AP, if the AP transmits a frame (e.g., a wakeup confirm frame, ACK frame, etc.) in response to the polling frame, the plurality of frames can be transmitted to the STA from the AP.

In a step S2020, the STA can transmit a response frame (e.g., a block ACK frame), which indicates whether an error is occurred in the plurality of frames, to the AP.

In doing so, assume that information (e.g., EOSP bit set to 1, More Data bit set to 0, etc.), which instructs the AP to stop transmission to the STA, is included in each of the plurality of frames transmitted in the step S2010. In this case, if error is occurred in any one of the plurality of frames, the STA stands by for a retransmission from the AP by maintaining an awake state in a step S2030. On the other hand, if the plurality of frames are successfully received all, the STA can enter the sleep state again.

For clarity of the description, the exemplary method described with reference to FIG. 20 is represented as a series of operations, by which a sequence of the steps is non-limited. If necessary, the respective steps may be performed simultaneously or in different order. Moreover, in order to implement the method proposed by the present invention, all the steps exemplarily shown in FIG. 20 are not necessary.

Regarding the implementation of the method exemplarily shown in FIG. 20, the matters of the various embodiments of the present invention mentioned in the foregoing description are independently applicable or at least two of the various embodiments of the present invention are simultaneously applicable.

Figure 21:
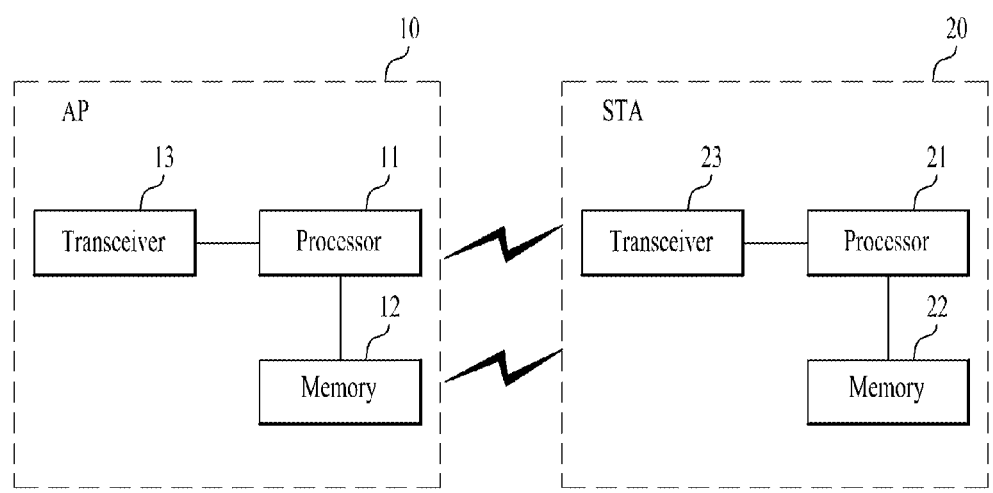
FIG. 21 is a block diagram for configurations of a radio device according to one embodiment of the present invention.

FIG. 21 is a block diagram for configurations of a radio device according to one embodiment of the present invention.

An AP 10 may include a processor 11, a memory 12, and a transceiver 13. An STA 20 may include a processor 21, a memory 22 and a transceiver 23. The transceiver 13/23 may transmit/receive radio signals and is able to implement a physical layer according to IEEE 802 system for example. The processor 11/21 is connected to the transceiver 13/23 and is able to implement a physical layer and/or a MAC layer according to IEEE 802 system. The processor 11/21 may be configured to perform operations according to various embodiments of the present invention mentioned in the foregoing description. Moreover, a module configured to implement an operation of the AP/STA according to various embodiments of the present invention mentioned in the foregoing description may be saved to the memory 12/22 and can be launched by the processor 11/21. The memory 12/22 may be built in the processor 11/21 or installed outside the processor 11/21 and can be then connected to the processor 11/21 by a means known to the public.

The detailed configurations of the AP and STA devices mentioned in the above description may be implemented in a manner that the matters of the various embodiments of the present invention mentioned in the foregoing description are independently applicable or that at least two of the various embodiments of the present invention are simultaneously applicable. And, duplicate contents may be omitted for clarity.

The aforementioned embodiments of the present invention may be implemented using various means. For instance, embodiments of the present invention can be implemented using hardware, firmware, software and/or any combinations thereof. The aforementioned embodiments of the present invention may be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

INDUSTRIAL APPLICABILITY

The embodiments of the present invention mentioned in the foregoing description are mainly described with reference to IEEE 802.11 system and may be applicable to various kinds of mobile communication systems in the same manner.

What is claimed is:

1. A method of performing a power saving by a station (STA) in a wireless local area network (WLAN) system, the method comprising:
transmitting, to an access point (AP), a wakeup poll frame after switching to an awake state from a sleep state;
receiving, from the AP, a wakeup confirm frame in response to the wakeup poll frame;
receiving, from the AP, a plurality of frames,
wherein each of the plurality of frames includes predetermined information indicating that AP-to-STA transmission is to be stopped;
determining whether an error has occurred in each of the plurality of frames; and
transmitting a response frame indicating whether the error has occurred to the AP,
wherein if the error has occurred in at least one of the plurality of frames, the STA maintains the awake state to receive the at least one of the plurality of frames which is retransmitted by the AP,
wherein the wakeup poll frame includes a dialog token field and a listen interval field,
wherein the dialog token field includes a non-zero value selected by the STA for identifying transaction of the wakeup poll frame and the wakeup confirm frame, and
wherein the listen interval field includes a request for changing a switch cycle of the awake state and the sleep state.

2. The method of claim 1, further comprising:
receiving the at least one frame in which the error has occurred which is retransmitted to the STA from the AP in response to the response frame.

3. The method of claim 1, wherein if all of the plurality of frames are received all successfully without error, the STA enters the sleep state.

4. The method of claim 1, wherein the wakeup poll frame is transmitted to the AP in a state that the STA does not receive a traffic indication map (TIM) from the AP.

5. The method of claim 1, wherein the predetermined information is an end of service period (EOSP) bit set to 1 in each of the plurality of frames.

6. The method of claim 1, wherein the predetermined information is a More Data bit set to 0 in each of the plurality of frames.

7. The method of claim 1, wherein the plurality of frames are included in an Aggregated-MAC Protocol Data Unit (A-MPDU).

8. The method of claim 1, wherein the response frame is a block acknowledgement (ACK) frame.

9. A method of supporting a power saving of a station (STA) by an access point (AP) in a wireless local area network (WLAN) system, the method comprising:
receiving, from the STA, a wakeup poll frame after switching to an awake state from a sleep state;
transmitting, to the STA, a wakeup confirm frame in response to the wakeup poll frame;
transmitting, to the STA, a plurality of frames,
wherein each of the plurality of frames includes predetermined information indicating that AP-to-STA transmission is to be stopped; and
receiving a response frame indicating whether an error has occurred in each of the plurality of frames from the STA,
wherein if the error has occurred in at least one of the plurality of frames, the AP retransmits the at least one frame in which the error has occurred to the STA upon the reception of the response frame,
wherein the wakeup poll frame includes a dialog token field and a listen interval field,
wherein the dialog token field includes a non-zero value selected by the STA for identifying transaction of the wakeup poll frame and the wakeup confirm frame, and wherein the listen interval field includes a request for changing a switch cycle of the awake state and the sleep state.

10. A station (STA) for performing a power saving in a wireless local area network (WLAN) system, the STA comprising:
a transceiver; and
a processor coupled to the transceiver,
wherein the processor is configured to:
  switch to an awake state from a sleep state,
  transmit, to an access point (AP), a wakeup poll frame using the transceiver,
  receive, from the AP, a wakeup confirm frame in response to the wakeup poll frame using the transceiver,
  receive, from the AP, a plurality of frames,
  wherein each of the plurality of frames includes predetermined information indicating that AP-to-STA transmission is to be stopped, and
  transmit a response frame indicating whether an error in at least one of the plurality of frames has occurred to the AP using the transceiver, wherein if the error has occurred in the at least one of the plurality of frames, the processor maintains the awake state to receive the at least one of the plurality of frames which is retransmitted by the AP, wherein the wakeup poll frame includes a dialog token field and a listen interval field, wherein the dialog token field includes a non-zero value selected by the STA for identifying transaction of the wakeup poll frame and the wakeup confirm frame, and wherein the listen interval field includes a request for changing a switch cycle of the awake state and the sleep state.

\* \* \* \* \*